Dec. 7, 1937.  A. SONNTAG  2,101,226
LEAKAGE COMPENSATOR FOR PUMPING SYSTEMS
Filed Dec. 3, 1935   2 Sheets-Sheet 1
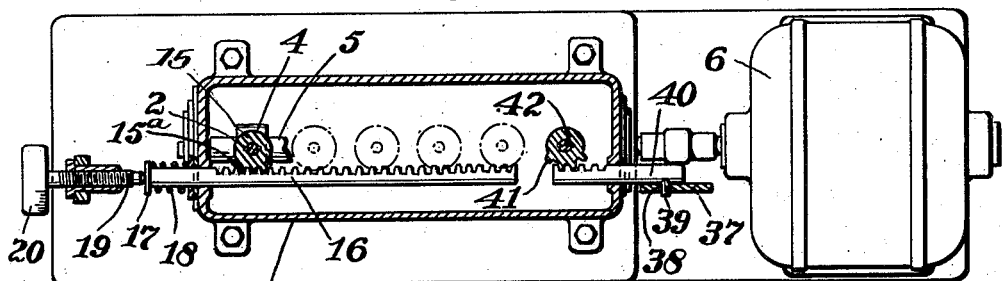
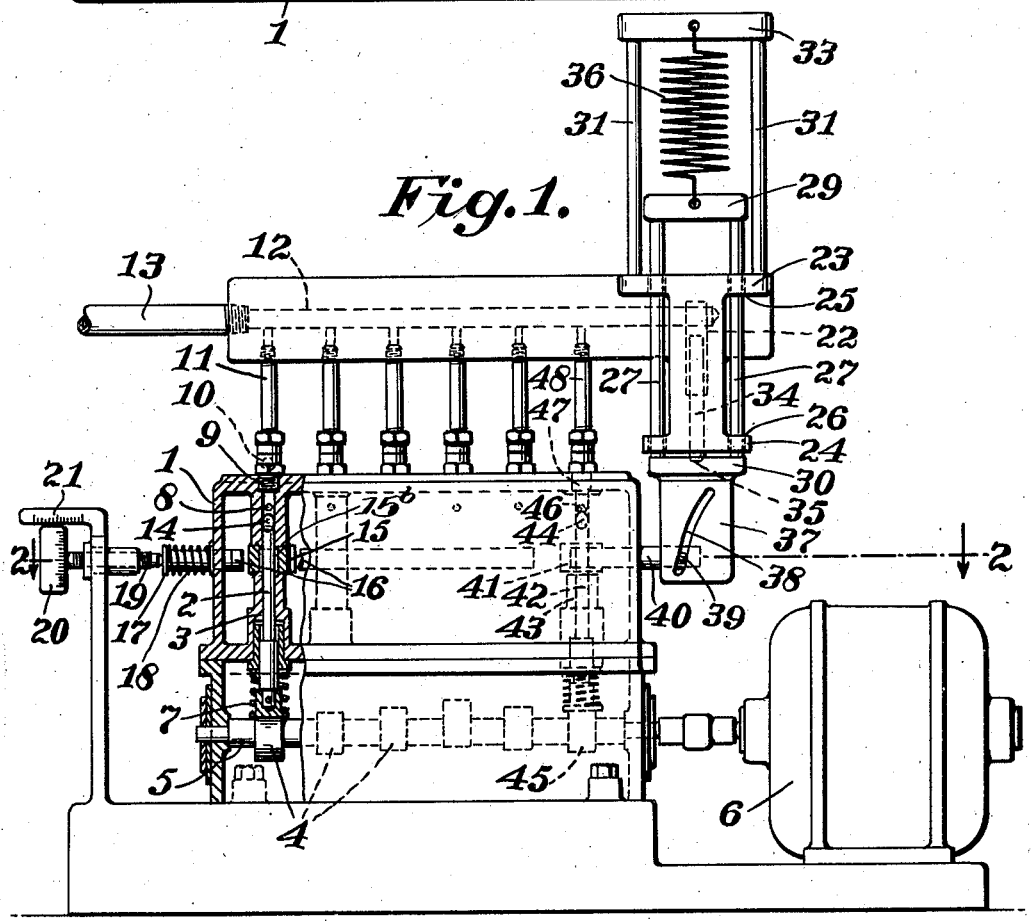
Inventor:
Alfred Sonntag, Dec. 7, 1937.  A. SONNTAG  2,101,226
LEAKAGE COMPENSATOR FOR PUMPING SYSTEMS
Filed Dec. 3, 1935  2 Sheets-Sheet 2
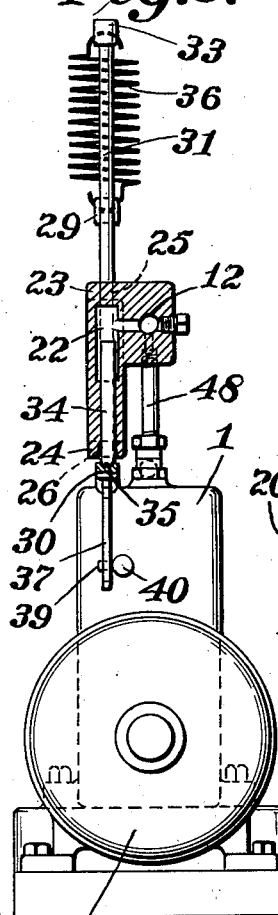
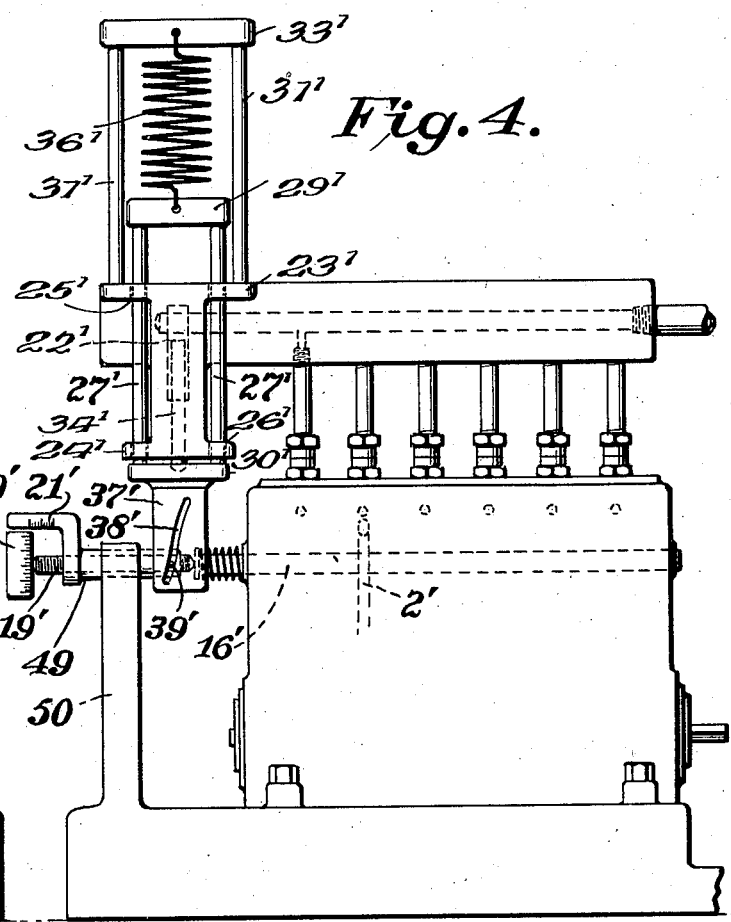
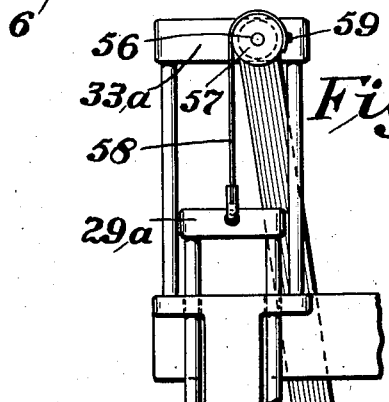
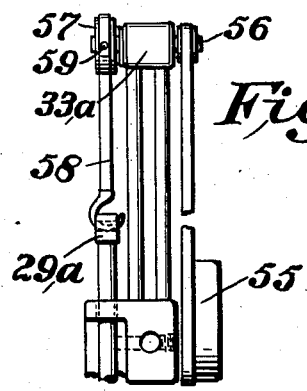
Inventor:
Alfred Sonntag, Patented Dec. 7, 1937

2,101,226

UNITED STATES PATENT OFFICE 2,101,226

LEAKAGE COMPENSATOR FOR PUMPING SYSTEMS

Alfred Sonntag, Moline, Ill., assignor, by mesne assignments, to American Machine and Metals, Inc., New York, N. Y., a corporation of Delaware Application December 3, 1935, Serial No. 52,714

5 Claims. (Cl. 103—37)

This invention relates to a method and apparatus for obtaining a constant rate of motion of the moving head in a hydraulic testing machine regardless of the load or pressure at which the machine is operating.

In making compressive or tensile tests it is desired to subject the specimen to be tested to a measurable load which exerts a uniform rate of compression or elongation to the specimen. If the testing machine is of the hydraulic type, the load is obtained by hydraulic pressure acting against a ram in a closed cylinder, and ordinarily the hydraulic pressure is derived by the action of an oil or other fluid pump which delivers the fluid to the closed cylinder.

Hydraulic testing machines as previously operated have been not entirely satisfactory, as the hydraulic system, including the pump and the cylinder in which the ram of the testing machine operates, is subject to perceptible leakage.

Since a test on a specimen always starts at zero load and rises to the maximum load which it is capable of withstanding, it follows that the leakage during a test also must vary in a relative degree. When the source of supply has a constant out-put, or is a constant speed pump, any leakage in the system interferes with the uniformity of the rate at which the fluid increases in the closed cylinder behind the ram, and consequently interferes with the uniformity of the movement of the ram, with the result that unless otherwise compensated for, the movement of the ram and the rate of elongation or compression of the specimen being tested gradually becomes slower as the pressure rises.

According to the present invention, the leakage in the system is compensated for automatically by increasing the rate at which fluid is supplied to the system by an amount equal to the leakage at the pressure existing in the fluid system at any time, whereby a truly constant rate of movement of the ram will be obtained.

In order to provide for an automatic increase of the rate at which fluid is supplied to the system, the leakage at intervals throughout the entire pressure range of the system is first ascertained, and a leakage curve plotted against corresponding pressures. A slot, which is a replica of this leakage curve, is then cut in a plate and utilized as a template for controlling the amount of additional discharge which the pump, or an auxiliary pump, delivers to the system. That may be done readily by mounting the plate having the slot therein, so that it is subjected constantly to the pressure of the system and has its movement controlled thereby, and by having the slot control an auxiliary means for increasing the pump discharge. Thus, as the pressure within the system, and consequently the leakage, varies, the position of the slot will vary and the control means will be shifted automatically to increase or decrease the extent to which the auxiliary-pump-discharge-increasing means is brought into operation.

The invention is further illustrated in the accompanying drawings and description, but it is to be understood that this further illustration and description are to be taken as an exemplification of the invention and the same is not limited thereto except as set forth in the appended claims.

In the drawings:

Figure 1 is a diagrammatic side elevation of an apparatus for carrying out my invention, with parts of the fluid pump being shown in section;

Fig. 2 is a section through the fluid pump on line 2—2 of Fig. 1;

Fig. 3 is an end view with a portion of the means for automatically increasing the delivery of fluid to the system being shown in section;

Fig. 4 is a side elevation of a modification of the invention; and

Figs. 5 and 6 are, respectively, side and end views of a modified means for progressively increasing the resistance to movement of the control plate under the force of the pressure in the fluid system.

In the drawings, the numeral 1 designates a pump or impeller unit of the type which is commonly used for obtaining a desired rate of flow into the fluid system of an hydraulic testing machine. This pump is of the constant stroke, variable discharge type and comprises a plurality of plungers 2 which are reciprocated in bores 3 by cams 4 on a shaft 5 which is driven by a motor 6. Springs 7 cause the plungers to be retracted and to be maintained in contact with the cams at all times. The upper end of each bore is provided with an inlet port 8 and an outlet port 9, having a ball valve 10, through which the fluid is discharged into conduits 11 which communicate with a manifold 12. The fluid conduit 13 leads from the manifold 12 to the cylinder of the press or hydraulic testing machine (not shown), in which the operating ram is mounted for reciprocatory movement, whereby the pressure exerted by the pump is transmitted to the specimen being tested. The upper ends of the plungers 2 are beveled or mitered to afford a plane oblique face 14 adapted to act as a cut-off for the inlet ports 8, depending upon their rotative position. The oblique faces 14 are so located that with the plungers in their uppermost position they may be rotated to completely cut off the intake port 8, or to completely open the same.

To provide for rotative adjustment of the plungers 2 so that variable discharge effects may be obtained from a constant stroke of the plungers, each plunger passes through a part 15 having a gear segment 15a which meshes with a common rack bar 16. Suitable keys or splines carried by the part 15 engage slots in the plungers to cause their rotation without interfering with their reciprocation. The end of the rack bar has a collar 17 secured thereto and a spring 18 urges the rack bar to the left, in Fig. 1, until it engages a screw 19 which has a micrometer wheel 20 fixed on its outer end. The micrometer wheel cooperates with the fixed scale 21, so that the opening or closing of the inlet ports 8 and consequently the rate of flow of the fluid into the system, may be controlled.

The pump just described is of a type commonly used for obtaining a desired rate of flow into a fluid system and of itself forms no part of my invention. If desired, other forms of pumps having a constant stroke with a variable discharge effect, or pumps having a variable stroke, may be used.

The fluid in the system communicates with a cylinder 22, which for sake of compactness is formed at the end of the manifold 12, but which may be formed as a separate unit. The cylinder 22 has upper and lower flanges 23 and 24 which are apertured at 25 and 26, so that rods 27 which, with the upper and lower cross-heads 29 and 30, form a yoke, are free to pass therethrough. The upper flange also acts as a base for the upright extensions 31 which support a cross-head 33.

A plunger 34 having a machined fit with the cylinder 22 is slidable therein, and has its outer end resting in a spherical seat 35 in the lower cross-head 30. Thus an increase of the pressure within the system tends to cause the lower head to be depressed, but such movement is restrained, to a great extent, by the coil spring 36, which has its opposite ends connected to the cross-heads 29 and 33.

The lower cross-head has secured to the under side thereof, a control plate 37. The plate 37 has a slot 38 which is a replica of the leakage curve of the fluid system formed therein. The slot 38 engages a pin 39 extending from a rack 40, which in turn meshes with a gear segment 41 similar to the segment 15a for rotating a plunger 42 reciprocably mounted in a bore 43 of the pump casing. The plunger 42 has an oblique plane upper face 44 and is reciprocated by a cam 45 on the cam shaft 5. The bore 43 has an inlet port 46 and a valved outlet port 47 which communicates with a conduit 48 leading to the manifold 12. While the construction of the plunger 42 and its related parts is the same as the plungers 2 and their related parts, the adjustment of the plunger 42 is independent of the adjustment of the plungers 2, and whereas the adjustment of the plungers 2 is manually controlled, the adjustment of the plunger 42 is controlled entirely by the extent to which the control plate 37, having the slot 38 therein, is depressed. As the movement of the pin 39 which engages the slot 38 is a function of the leakage in the system, the adjustment of the plunger 42 is always such as to cause an additional supply of fluid, just sufficient to offset the loss of fluid due to leakage, to be introduced into the system.

While the plunger 42 is shown and has been described as operated by the same cam shaft which operates the plungers 2, it will be obvious that if desired, the plunger 42 may be a part of a control means which is independent entirely of the main means for creating the initial rate of flow into the fluid system. Likewise, if desired, the means for controlling the auxiliary discharge-increasing means may comprise two or more units.

The operation of the invention is as follows:

Assuming that a tensile test is to be made and that the specimen is to be elongated at a uniform rate, the micrometer wheel 20 is adjusted along the fixed scale 21 to rotatably position the plungers 2 with respect to the inlet ports 8, to give the desired rate of initial fluid discharge into the system by the pump, which discharge rate will be indicated by the scale 21 and micrometer wheel 20. The pump is then started so that fluid will be pumped into the system and into the closed cylinder to operate the ram of the press or testing machine. The pressure of the fluid in the system, in addition to exerting its force against the operating ram of the press to produce the elongation of the specimen undergoing the test, also exerts its force against the plunger 34 in cylinder 22, and as the pressure, and consequently the leakage in the system, increase, the plunger gradually will depress the control plate 37. Such movement of the control plate 37 causes the pins 39 and rack bar 40 to be shifted to the right, and as the rack bar engages gear segment 41 on plunger 42, that plunger will have its rotative position with respect to the inlet port 46 so altered that it will effect an increase of the rate of discharge equal to the leakage rate of the system at that pressure. As the pump plungers 2 will force the fluid into the system at a definite rate for any given setting of the micrometer wheel 20, and as the auxiliary pump plunger 42 will supplement the discharge of the pump plungers 2 to an extent just equal to the leakage of the system at any pressure, the fluid in the system will increase at a uniform rate, and consequently the ram of the press will move at a uniform rate during the entire test.

The modification shown in Fig. 4 differs from the form of the invention shown in Fig. 1, in that the control plate 37' is adapted to cause a shifting of the rack bar 16' which determines the rotative position of the plungers 2' which determine the rate of delivery into the fluid system. In this form of the invention, a scale 21' projects from a square sleeve 49 which is slidably but non-rotatively mounted in a fixed standard 50, and the screw 19' which has its inner end bearing against the outer end of the rack bar 16' is threaded into this sleeve. Thus the rack bar 16' may be shifted either by a longitudinal movement of the sleeve 49 in the standard 50, or by threading the screw 19' in or out of the sleeve by means of the micrometer wheel 20'. The inner end of the sleeve 49 has a pin 39' engaging a slot 38' in the control plate 37'. The slot 38' like the slot 38 shown in Fig. 1, is a replica of the leakage curve of the fluid system. The control plate 37' is mounted for reciprocable movement responsive to the pressure on the fluid system in the same manner as is the control plate 37 of Fig. 1, and in the drawings the parts similar to the corresponding parts of Fig. 1 are designated by primed reference characters.

In this form of the invention the parts are so arranged that when no pressure is exerted on the system, the pin 39' is at or near the bottom of the slot 38'. As the pressure in the system increases the plunger 34' in the cylinder 22' causes the control plate 37' to be depressed and the sleeve 49, which carries the pin 39', to be moved to the right. As the adjusting screw 19' is threaded into the sleeve 49 it will move with the sleeve and its inner end will cause the rack bar 16' to be moved inwardly and the rotative position of the plungers 2' thereby shifted with respect to the inlet ports.

Thus, the initial rate of discharge will be determined by the setting of adjusting screw 19' and as the pressure in the system increases and the control plate 37' is depressed, the amount of fluid delivered to the system by the pump will be increased beyond that for which it was initially set, by an amount just sufficient to compensate for the loss of fluid due to the leakage in the system. The automatic shifting of the rack bar 16' under the influence of the control plate 37' is independent entirely of any adjustment of the screw 19' in or out of the sleeve 49 to vary the initial rate of discharge into the system, and such automatic shifting causes the rate of elongation of the specimen being tested, as measured by the rate of fluid discharge indicated by the scale 21' and micrometer wheel 20', to be maintained constant. The pin 39' engaging in the slot 38' prevents longitudinal movement of the sleeve 49 except during the automatic correction for leakage, and permits the screw 19' therein to be manually adjusted at all times.

In Figs. 5 and 6 the means for causing the progressive resistance to movement of the control plate comprises a pendulum 55 which swings about a pivot 56 mounted in the cross-head 33a. The pivot 56 has fixed thereto a drum 57 to which one end of the strap 58 is secured at 59. The other end of the strap is secured to the cross-head 29a, so that as the pressure of the fluid tends to depress the control plate (not shown), that movement will be progressively resisted by the upward swing of the pendulum 55.

It will be apparent from the foregoing description that the present invention provides a method and means for the actual testing of a specimen by subjecting it to a uniform rate of elongation, or compression, throughout the entire test, despite the variation of operating fluid pressure, and leakage in the system.

I claim:

1. In an hydraulic system adapted for use with testing machines, a primary impeller for introducing liquid into the system at a predetermined rate, an auxiliary impeller, a template shaped to bear a definite relation to the leakage curve of the system means responsive to the pressure in the system for imparting movement to said template, and means so operated by the movement of the template as to cause said auxiliary impeller to introduce additional liquid into the system to compensate for that lost through leakage.

2. In an hydraulic system adapted for use with testing machines and to operate under pressure, a primary impeller for forcing liquid into the system at a predetermined rate, an auxiliary impeller, a template which is a replica of the leakage curve of the system, means responsive to the pressure in the system for imparting movement to said template, and means operated by the movement of the template to cause said auxiliary impeller to introduce additional liquid into the system to compensate for that lost through leakage.

3. In an hydraulic system adapted for use with testing machines, a primary impeller for forcing liquid into the system at a predetermined rate, an auxiliary impeller, a member having a slot therein having a shape bearing a definite relation to the leakage curve of the system, means responsive to the pressure in the system for imparting movement to said member, and means so operated by the movement of said slotted member and controlled by the shape of the curve therein as to cause said auxiliary impeller to introduce additional liquid into the system to compensate for that lost through leakage.

4. In an hydraulic system adapted for use with testing machines, a primary impeller for forcing liquid into the system at a predetermined rate, an auxiliary impeller, a member having a slot therein which is a replica of the leakage curve of the system, means responsive to the pressure in the system for imparting movement to said member, and means operated by the movement of said slotted member and controlled by the shape of the slot therein to cause said auxiliary impeller to introduce additional liquid into the system to compensate for that lost through leakage.

5. In an hydraulic system adapted for use with testing machines, a primary impeller for introducing liquid into the system at a predetermined rate, an auxiliary impeller, a template shaped to bear a definite relation to the leakage curve of the system, means for mounting said template for reciprocal movement, means responsive to the pressure in the system for imparting movement to said template, means tending to restrain movement of said template, and means so operated by the movement of the template as to cause said auxiliary impeller to introduce additional liquid into the system to compensate for that lost through leakage.

ALFRED SONNTAG.